United States Patent
Meintschel et al.

(10) Patent No.: US 7,934,475 B2
(45) Date of Patent: May 3, 2011

(54) INTERNAL COMBUSTION ENGINE HAVING A VARIABLE COMPRESSION RATIO

(75) Inventors: Jens Meintschel, Esslingen (DE);
Tilmann Römheld, Waiblingen (DE);
Dietmar Schröer, Remseck (DE);
Thomas Stolk, Kirchheim (DE);
Alexander von Gaisberg-Helfenberg, Beilstein (DE)

(73) Assignee: Daimler A G, Stuttgart (DE)

( * ) Notice: Subject to any disclaimer, the term of this patent is extended or adjusted under 35 U.S.C. 154(b) by 615 days.

(21) Appl. No.: 12/079,935

(22) Filed: Mar. 28, 2008

(65) Prior Publication Data

US 2008/0283027 A1     Nov. 20, 2008

Related U.S. Application Data (63) Continuation-in-part of application No. PCT/EP2006/009121, filed on Sep. 20, 2006.

(30) Foreign Application Priority Data

Oct. 1, 2005 (DE) .................. 10 2005 047

(51) Int. Cl.
*F02B 75/04* (2006.01)

(52) U.S. Cl. ............ 123/48 B; 123/48 C; 123/78 BA; 123/78 C (58) Field of Classification Search ....... 123/48 R–48 D, 123/78 R–78 F
See application file for complete search history.

(56) References Cited

U.S. PATENT DOCUMENTS

| | | | |
|---|---|---|---|
| 1,334,759 A | 3/1920 | Huebner |
| 2,630,467 A | 3/1953 | Winther |

FOREIGN PATENT DOCUMENTS

| | | |
|---|---|---|
| DE | 30 04 402 | 8/1981 |
| DE | 199 18 592 | 10/2000 |
| DE | 100 26 634 | 12/2001 |
| DE | 100 51 271 | 4/2002 |
| DE | 102 21 334 | 11/2003 |
| DE | 10 2005 020 270 | 11/2005 |
| EP | 0 640 176 | 5/1997 |
| EP | 1 199 452 | 4/2002 |
| EP | 1 307 642 | 5/2004 |
| GB | 1 166 180 | 10/1969 |
| JP | 58 133 158 | 8/1983 |
| JP | 58 133158 | 8/1983 |
| JP | 2002 174132 | 6/2002 |
| JP | 2008-532636 | 8/2008 |

*Primary Examiner* — Noah Kamen
(74) *Attorney, Agent, or Firm* — Klaus J. Bach (57) ABSTRACT

In an internal combustion engine including cylinders arranged in a housing, a crankshaft, pistons disposed in the cylinders so as to be movable by the crankshaft, and a device for varying a compression ratio of the internal combustion engine wherein the device, for varying the compression ratio, includes an adjusting structure which varies the effective length of a connecting rod of the piston, the lift of the crankshaft or the position of the cylinder with respect to the center of the crankshaft, an operating structure is provided by rotation of which the position of the adjusting structure can be controlled, and a drive device for controlling the operating structures contains a coupling mechanism with an integrated brake function, whereby h the adjusting structure can either be placed in operative connection with the crankshaft or can be blocked.

6 Claims, 11 Drawing Sheets

INTERNAL COMBUSTION ENGINE HAVING A VARIABLE COMPRESSION RATIO

This is a Continuation-in-Part Application of pending International patent application PCT/EP2006/009121 filed Sep. 20, 2006 and claiming the priority of German patent application 10 2005 047 203.6 filed Oct. 1, 2005.

BACKGROUND OF THE INVENTION

The invention relates to an internal combustion engine having a variable compression ratio obtained by varying the length of the connecting rods of the piston, the position of the crankshaft or the position of the cylinder head relative to the cylinder.

EP 1 307 642 B1 discloses a reciprocating-piston internal combustion engine having a device for varying the compression ratio. The device has, in particular for one cylinder of the internal combustion engine, a main connecting rod which is connected to a piston, a transverse lever which is connected by means of pivot joints to the main connecting rod and to the crankshaft, an auxiliary connecting rod which is connected by means of pivot joints to a transverse lever and to an eccentric which is assigned to the at least one cylinder, and a drive device for an adjusting shaft on which the eccentric is arranged.

By means of rotation of the adjusting shaft and therefore by means of rotation of the eccentric, the position and the setting of the auxiliary piston rod and of the trans-verse lever are adjustable. The position of the piston of the internal combustion engine is therefore moved, and the compression ratio is therefore varied. The adjusting shaft with the eccentric performs a rotational movement which is synchronous with the crankshaft, or it is rotated by means of an adjusting mechanism (not shown specifically). This known device is suitable for adjusting the compression ratio while simultaneously improving the engine operating smoothness.

DE 30 04 402 A1 shows a device for adjusting the compression ratio of reciprocating-piston internal combustion engines, in which the center of the crankshaft can be adjusted relative to the position of the cylinders via an eccentric bearing arrangement, as a result of which the compression ratio is changed.

EP 0 640 176 B1 likewise discloses a device for adjusting the compression ratio of reciprocating-piston internal combustion engines, in which the cylinders are tilted relative to the housing of the internal combustion engine via an eccentric, which is mounted on an adjusting shaft, and levers. In this way, the position of the upper edge of the cylinders changes relative to the center of the crankshaft, and, as a result, a variation of the compression ratio takes place during the adjusting process.

DE 102 21 334 A1 likewise describes a device for adjusting the compression ratio of reciprocating-piston internal combustion engines, in which, similarly to EP 0 640 176 B1, the upper edge of the cylinders is moved relative to the center of the crankshaft. In this case, the upper part of the cylinder housing is moved in a translatory fashion by means of two eccentrics which are mounted on adjusting shafts, and the compression ratio is thereby varied.

DE 100 26 634 A1 likewise discloses a device for adjusting the compression ratio of reciprocating-piston internal combustion engines, in which an eccentric is arranged between the piston rod and the piston of the internal combustion engine. Said eccentric can be adjusted externally by an adjusting shaft via levers, as a result of which the compression ratio is likewise changed.

A feature of all of the above-mentioned reciprocating-piston internal combustion engines is the variation of the compression ratio by means of rotation of at least one adjusting shaft.

It is an object of the present invention to provide a mechanism for facilitating rotation of an adjusting shaft for changing the transmission ratio of an engine by a simple and compact means and with little energy input.

SUMMARY OF THE INVENTION

In an internal combustion engine including cylinders arranged in a housing, a crankshaft, pistons disposed in the cylinders so as to be movable by the crankshaft, and a device for varying a compression ratio of the internal combustion engine wherein the device for varying the compression ratio includes an adjusting structure which varies the effective length of a connecting rod of the piston, the lift of the crankshaft or the position of the cylinder with respect to the center of the crankshaft, an operating structure is provided by rotation of which the position of the adjusting structure can be controlled, and a drive device for controlling the operating structures contains a coupling mechanism with an integrated brake function, by means of which the adjusting structure can either be placed in operative connection with the crankshaft or can be blocked.

In a particular embodiment, an eccentric which is assigned to a particular cylinder is mounted in the housing and, by rotation, changes the position and/or direction of an adjusting link or lever. A drive device, which is driven by the crankshaft, is provided for driving a adjusting shaft on which the eccentric is arranged. The internal combustion engine according to the invention is distinguished in that the drive device of the device for varying the compression ratio contains a coupling mechanism with an integrated brake function, by means of which the adjusting shaft can be selectively connected to the crankshaft or it can be locked.

The drive device of the device for varying the compression ratio permits an adjustment to a high compression ratio, an adjustment to a low compression ratio and maintaining a given setting.

In order to rotate the adjusting shaft and therefore the eccentric for adjustment to a high compression ratio, energy is supplied to the drive device by the crankshaft and is then transmitted to the adjusting shaft via the coupling mechanism. If the present compression ratio is to be maintained, then a rotation of the adjusting shaft is blocked by the brake function integrated in the coupling mechanism. If the drive device neither places the adjusting shaft in operative connection with the crankshaft nor blocks it, the adjusting shaft can automatically rotate in the direction of low compression. In order to rotate the adjusting shaft and therefore the eccentric for adjustment to a low compression ratio, energy is supplied to the components by the gas pressure in the combustion space, with free rotation of the adjusting shaft being made possible by the base of the coupling mechanism.

The drive device can be actuated in every operating position of the internal combustion engine. The coupling mechanism with the integrated brake function makes a very compact construction of the drive device with few components possible.

Depending on the embodiment of the device for varying the compression ratio, the compression ratio is brought about by varying the length of the piston rod, varying the piston stroke and/or displacing the upper edge of the cylinder relative to the crankshaft.

In an advantageous refinement of the invention, the coupling mechanism has a rotor made of a hysteresis material which is operatively connected to the adjusting shaft. A first pole structure is connected in a rotationally fixed manner to a drive wheel driven by the crankshaft; and a second pole structure is connected fixedly to the housing, with it being possible to optionally activate the first and the second pole structures. In this case, the first pole structure can be assigned a first housing-mounted winding, and the second pole structure can be assigned a second housing-mounted winding, which windings can optionally be energized in order to activate the coupling function or the brake function of the coupling mechanism.

In an alternative embodiment of the invention, the coupling mechanism has an armature made of a magnetizable material, which is operatively connected to the adjusting shaft. A spring element biases the armature into a rotational connection with a drive wheel driven by the crankshaft; and an optionally activatable winding is fixedly connected to the housing for pulling the armature counter to the force of the spring element into connection with the housing. The brake function of the coupling mechanism is activated by energization of the winding.

In a further refinement of the invention, the drive device furthermore has a gearing, for example a two-stage planetary gear set, and therefore the rotational movement of the crankshaft can be transmitted to the adjusting shaft in a significantly slowed manner. This increases the adjusting accuracy of the eccentric and, in addition, reduces the power loss of the coupling mechanism. The position of the adjusting shaft can additionally be detected in this case by means of a sensor.

In a further refinement of the invention, the drive device can advantageously be operatively connected to a wraparound drive or rolling contact gearing for driving camshafts.

Further features and advantages of the invention will become more readily apparent from the following description with reference to the attached drawings, in which:

DESCRIPTION OF THE VARIOUS EMBODIMENTS

Figure 1:
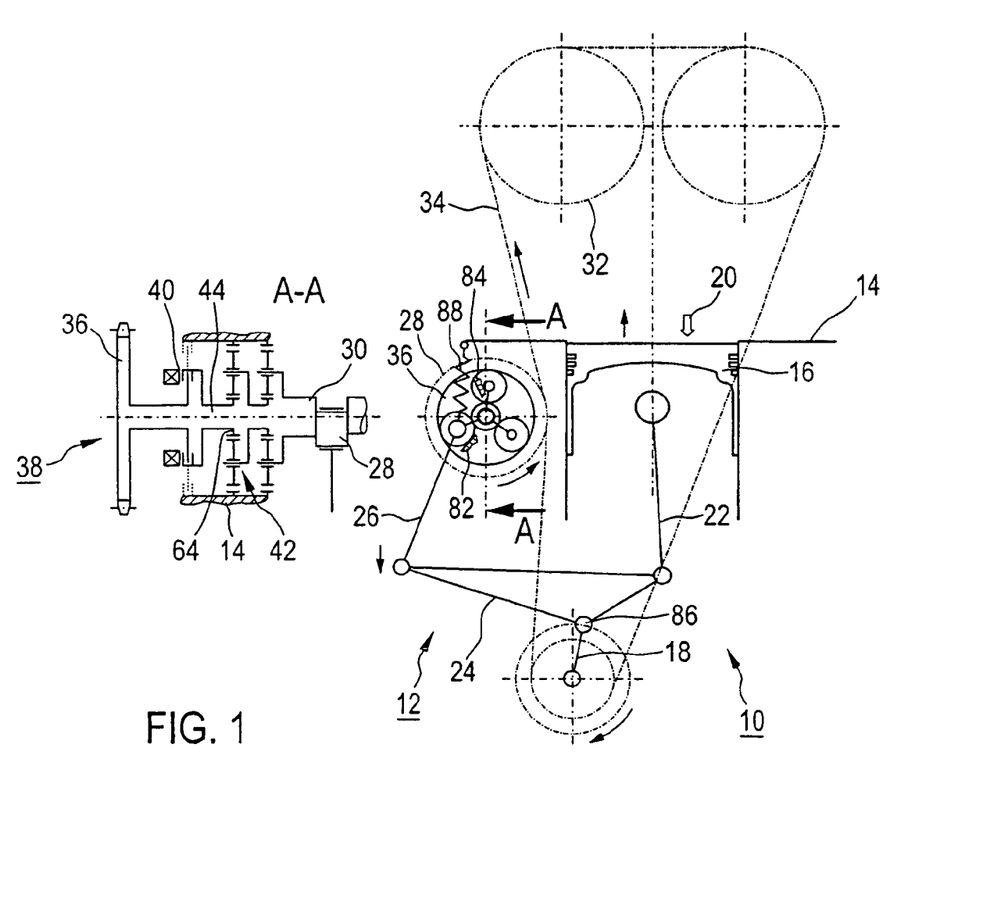
FIG. 1 shows a schematic illustration of a first embodiment of a device for varying the compression ratio in a setting for high compression.

FIG. 1 illustrates, schematically in a cross section and a partial longitudinal section, an internal combustion engine 10 having a device 12 for varying the compression ratio, in an operating state of the adjustment set to a high compression ratio. The internal combustion engine 10 has a housing 14 in which the piston 16 and the crankshaft 18 move. The piston 16 is moved downward by the gas force 20 and transmits said movement via the main connecting rod 22 and the transverse lever 24 to the crankshaft 18. The trans-verse lever 24 is supported by means of the auxiliary connecting rod 26, which serves as an adjusting link supported by an eccentric 28 which, for its part, is arranged on the adjusting shaft 30.

The internal combustion engine 10 furthermore has two camshafts 32 which are driven via a wraparound drive 34, for example a chain drive, by the crankshaft 18. The wraparound drive 34, for its part, drives a sprocket 36 which serves as the drive wheel and is connected to the adjusting shaft 30 via a drive device 38. The drive device 38 contains, in particular, a coupling mechanism 40 with an integrated brake function, and a gearing 42. The input-side shaft piece 44 of the gearing 42 can be connected via the coupling mechanism 38 both to the sprocket 36 (coupling function) and to the housing 14 (brake function).

Figure 4A:
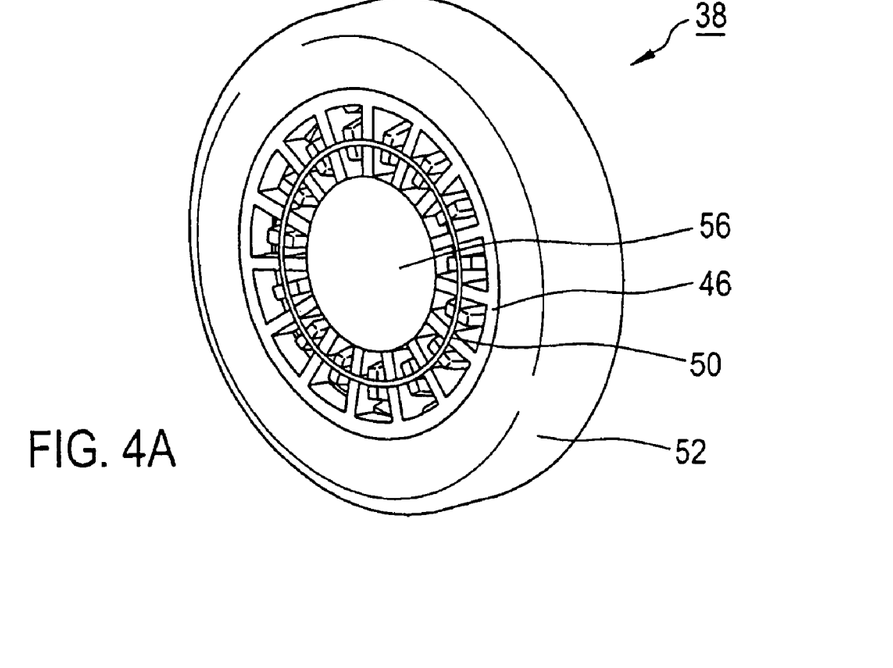
FIGS. 4A, 4B, and 4C show perspective views of a drive device for an adjusting shaft according to a first exemplary embodiment of the invention.
Figure 4B:
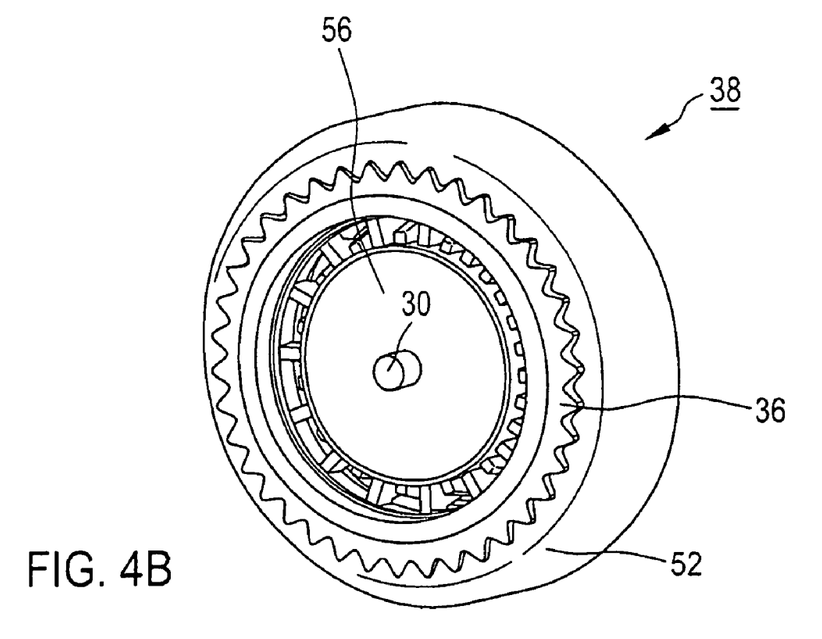
Figure 4C:
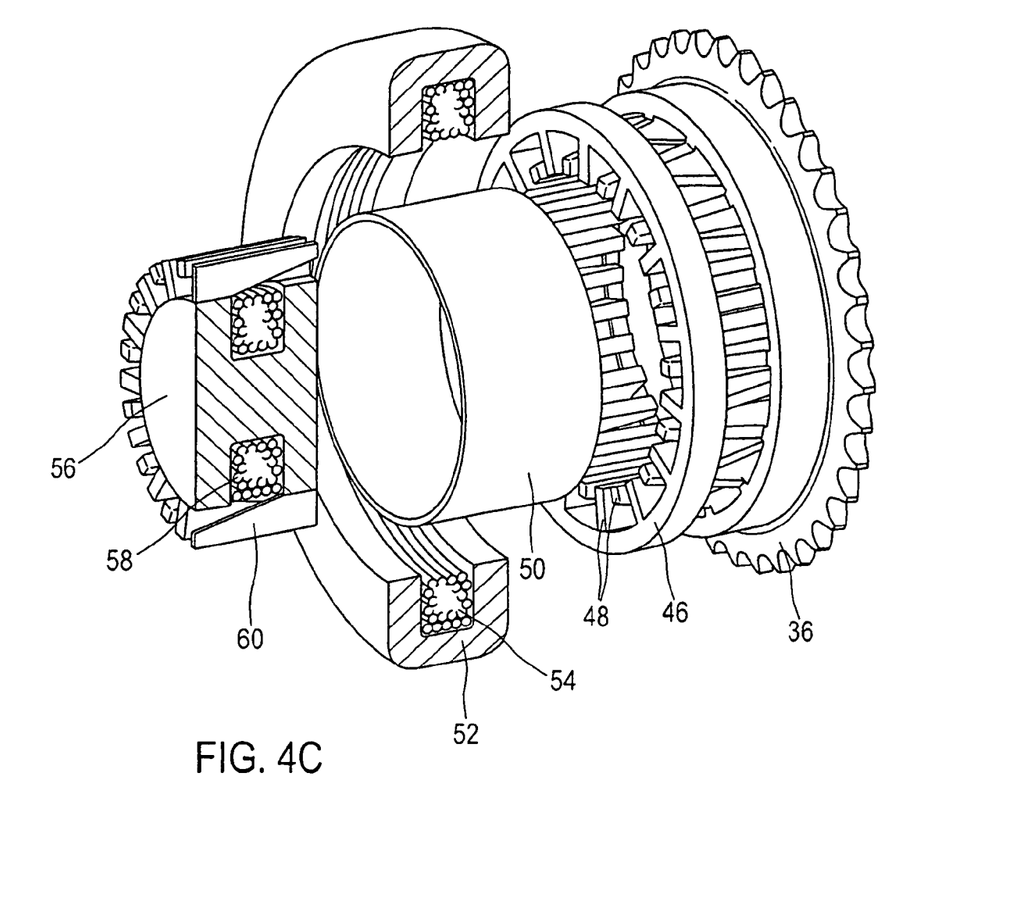

The construction and the functioning of a drive device 38 for the adjusting shaft 30 according to a first exemplary embodiment is now explained in more detail with reference to FIGS. 4 to 6.

The sprocket 36 which is driven by the wraparound drive 34 is formed integrally with a rotor 46 having a first pole structure 48 which rotates together with the sprocket 36. An annular coupling rotor 50, which is made of a hysteresis material, serves as a magnetic coupling and brake element and is also connected in a rotationally fixed manner to the input shaft 44 of the gearing 42, is arranged radially within said rotor 46. The hysteresis material is preferably half-hard magnetically and has a pronounced loop in the B-H diagram. The rotor 46 with the first pole structure 48 is furthermore surrounded radially by a first housing-mounted stator 52 with a winding 54. A second housing-mounted stator 56 with a winding 58 and a second pole structure 60 is arranged radially within the rotor 46 and within the coupling rotor 50.

Figure 6A:
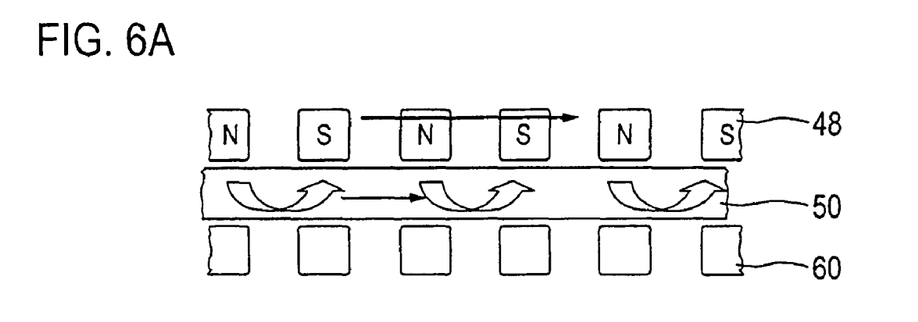
FIGS. 6A and 6B show schematic illustrations for explaining the functioning of the drive device for an adjusting shaft according to FIG. 4.
Figure 6B:
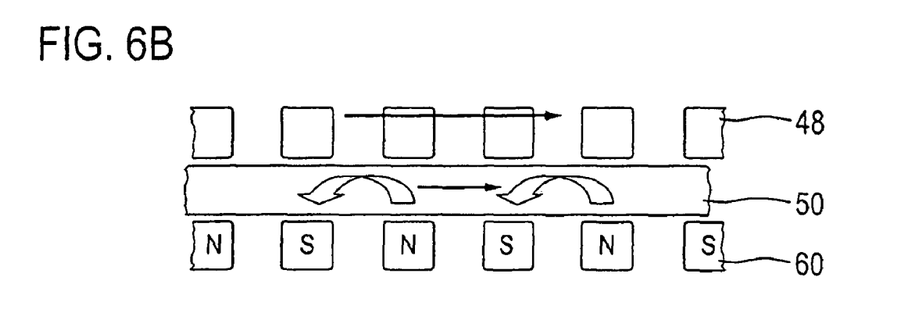

As illustrated in FIGS. 6A and 6B, the coupling rotor 50 made of the hysteresis material has the flow passing tangentially through it when the winding 54 of the first stator 52 is energized, because of the first (coupling-side) pole structure 48 on its outer side (at the top in FIG. 6A) or has the flow passing tangentially through it when the winding (58) of the second stator 56 is energized, because of the second (brake-side) pole structure 60 on its inner side (at the bottom in FIG. 6B). In this case, the magnetic flux from the winding 54 is coupled into the rotating pole structure 48 via an air gap 62. The constant magnetic reversal of the hysteresis material during movement of the coupling rotor 50 gives rise to an application of force which either accelerates the coupling rotor 50 (FIG. 6A) or brakes it (FIG. 6B).

The drive device 38 constructed in such a manner operates contactlessly and in a manner free from wear and, in addition, can easily be controlled. Owing to the integration of the brake function into the coupling mechanism 40, a very compact construction is made possible with few components. The coupling moment and the brake torque are virtually independent of the rotational speed. In addition to the coupling rotor 50, which is made from a hysteresis material, having an annular or band-shaped construction, which is illustrated in FIGS. 4 and 5, a disc-shaped construction of the coupling rotor 50 is also conceivable.

Figure 5:
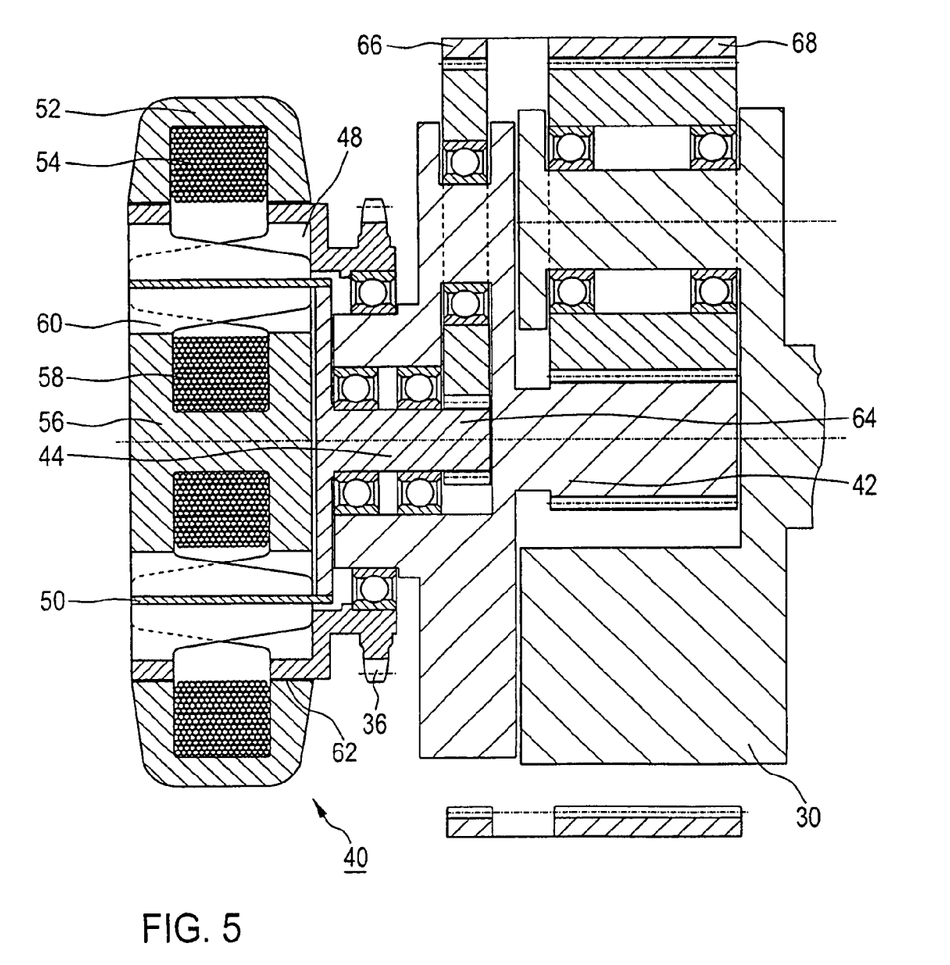
FIG. 5 shows a sectional view of the drive device for an adjusting shaft of FIG. 4.

The gearing 42 can be embodied, for example, as a two-stage planetary gear set, as illustrated in FIGS. 1 and 5. The input-side sun gear 64 is connected to the input-side shaft piece 44, which is driven by the sprocket 36, and the output-side web is connected to the adjusting shaft 30. The internal gears 66, 68 of the two stages of the two-stage planetary gear set 42 are in each case supported on the housing 14.

Figure 7:
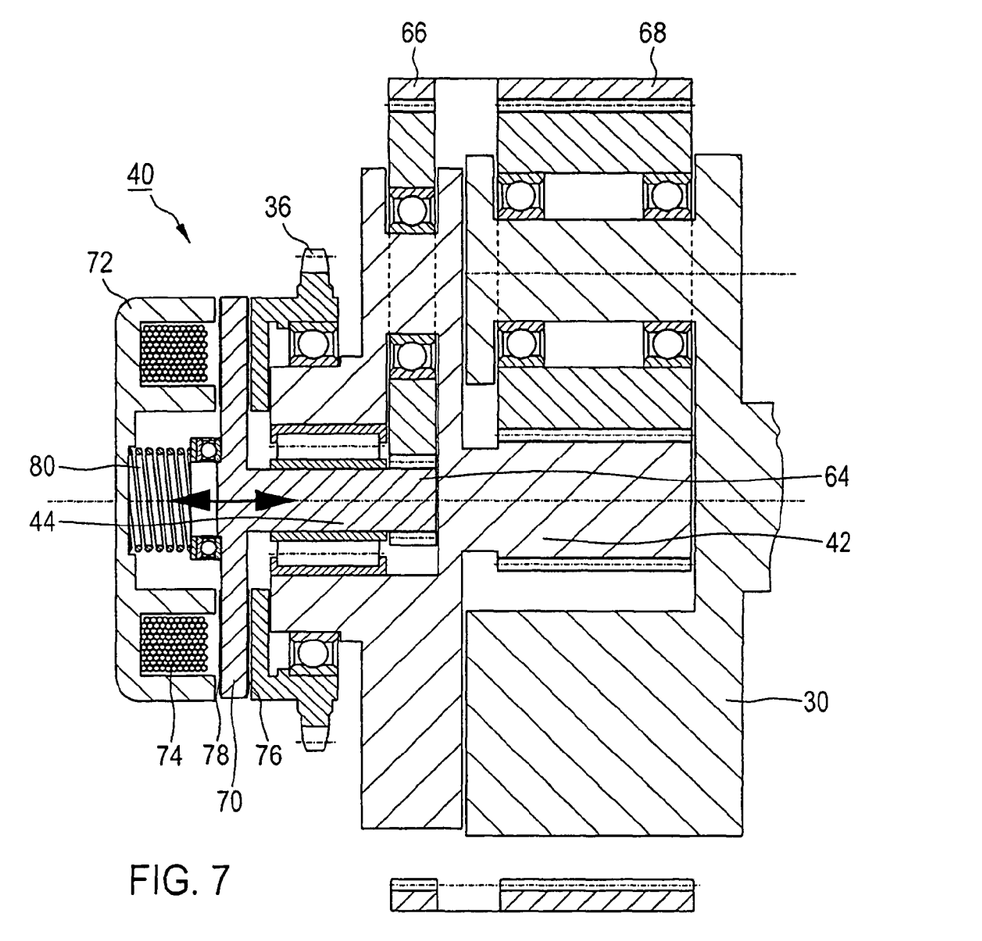
FIG. 7 shows a sectional view of a drive device for an adjusting shaft according to a second exemplary embodiment of the invention.

A description of the construction and of the functioning of a drive device 38 for the adjusting shaft 30 according to a second preferred exemplary embodiment now follows with reference to FIG. 7.

In comparison to the drive device 38 described above with reference to FIGS. 4 to 6, in this exemplary embodiment of the drive device 38 for the adjusting shaft 30, instead of two activatable pole structures 48, 60 and a coupling rotor 50 made of a hysteresis material, the following design is provided.

An armature 70 made of a magnetizable material is connected integrally here to the input-side shaft piece 44 of the gearing 42. Said magnetizable armature 70 is placed axially between the sprocket 36, which is driven by the crankshaft 18, and a housing-mounted stator 72 with an integrated winding 74. In addition, the armature 70 is provided with a respective friction lining 76, 78 on each of its two axial sides and is biased in the direction of the sprocket 36 by means of a spring element 80 supported on the housing-mounted stator 72.

Without the winding 74 of the stator 72 being energized, the armature 70 is pressed with its friction lining 76 against the sprocket 36 by means of the spring element 80, such that the armature 70 and therefore also the input-side shaft piece 44 of the gearing 42 rotate together with the sprocket 36. In other words, the adjusting shaft 30 is placed in operative connection with the crankshaft 18 by means of the switched-on coupling mechanism 40. When the winding 74 of the stator 72 is energized, the magnetizable armature 70 is pulled in the direction of the housing-mounted stator 72 counter to the force of the spring element 80 and therefore the gearing input 44 is braked. The compensation for the resulting axial movement of the gearing input 44 (for example <1.0 mm) is absorbed by the displaceable sun gear 64 of the planetary gear set 42.

The remaining components of the drive device 38 are identical to those of the first exemplary embodiment above, and therefore repeated explanation of the same is omitted.

Again with reference to FIG. 1, the two-stage planetary gear set 42 of the drive device 38 converts the rotational speed of the sprocket 36 into a low rotational speed of the adjusting shaft 30. In addition, two housing-mounted stops 82, 84 are provided for the adjusting shaft 30, which stops delimit a possible rotational angle of the adjusting shaft to, for example, approximately 100° to approximately 150°. In addition, a sensor (not illustrated) can be provided for detecting the rotational position of the adjusting shaft 30.

An adjusting process of the compression ratio from a low compression to a high compression takes place in the following way.

As indicated in FIG. 1, the crankshaft 18 rotates clockwise and, in the process, drives the wraparound drive 34. As a result, the sprocket 36 is rotated counter to the direction of rotation of the crankshaft 18. If the operating range of the internal combustion engine 10 is to be adjusted in the direction of high compression, a control unit (not shown) causes the coupling mechanism 40 of the drive device 38 to be switched on, that is to say, for example, causes the winding 54 of the stator 52 to be energized such that the rotational movement of the sprocket 36 is transmitted via the shaft piece 44 and the planetary gear set 42 to the adjusting shaft 30. On account of the high transmission ratio in the two-stage planetary gear set 42, the adjusting shaft 30 rotates counter to the direction of rotation of the crankshaft, but at a significantly slower speed.

The rotation takes place to the first stop 82. When the adjusting shaft 30 or a stop mating piece which is fastened thereto buts against the first stop 82, the coupling mechanism 40 is opened in order to avoid damage. In this case, the coupling mechanism 40 may optionally also slip.

During such a rotation of the adjusting shaft 30 in the direction of high compression, the eccentric 28 and the auxiliary piston rod 26 are placed into a virtually stretched-out position, with the first stop 82 avoiding a dead-center position in an entirely stretched-out position. As a result of the rotation of the eccentric 28 and the movement of the auxiliary piston rod 26, the transverse lever 24 is rotated about its point of articulation 86 to the crank shaft 5. Said rotation of the transverse lever 24, in turn, brings about a movement of the main piston rod 22 and of the piston 16 upward. Said movement of the piston 16 is superposed on the normal oscillating piston movement and, at the top dead center of the piston movement, generates a higher piston position and therefore a higher compression in the combustion chamber in relation to a position of the adjusting shaft 30 before the latter is rotated. Said high compression is maintained for as long as the adjusting shaft 30 bears against the first stop 82.

Figure 2:
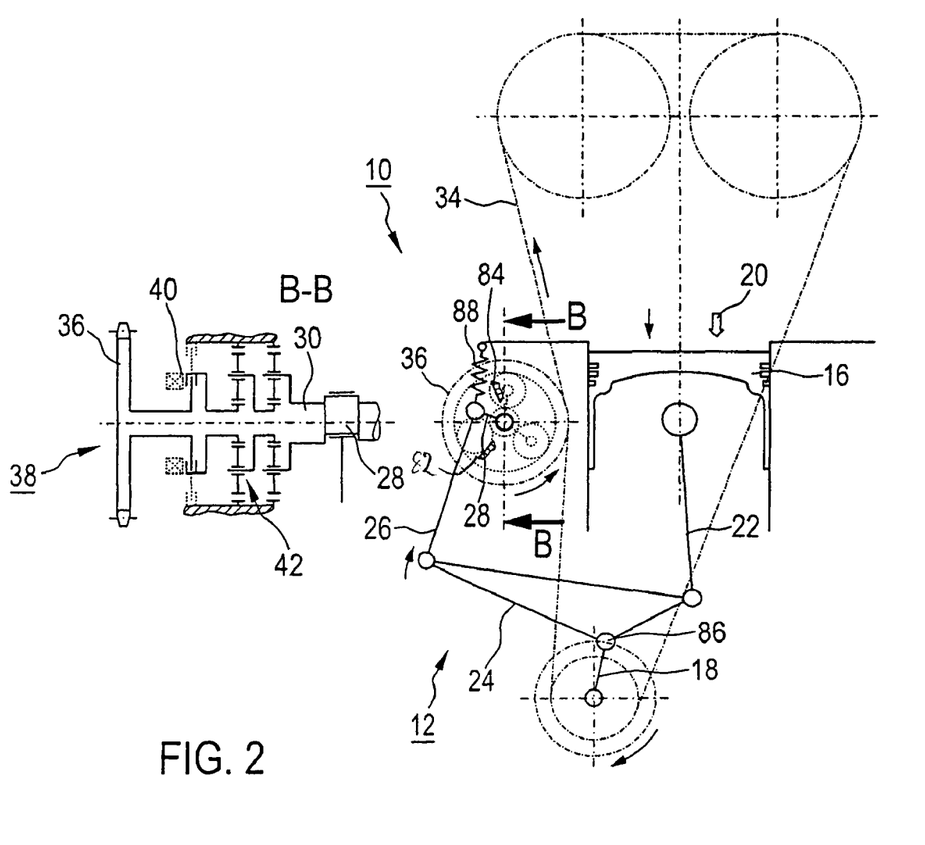
FIG. 2 shows a schematic illustration of the first embodiment of the device for varying the compression ratio in a setting for low compression.

FIG. 2 illustrates, schematically in a cross section and a partial longitudinal section, the internal combustion engine 10 from FIG. 1 having the device 12 for varying the compression ratio, in an operating state of the adjustment to low compression. In FIG. 2, the same elements and components are provided with the same reference numbers as in FIG. 1.

An adjusting process to low compression of the internal combustion engine 10 takes place as follows. The coupling mechanism 40 of the drive device 38 is activated in such a manner that neither a coupling action nor a brake action is produced, i.e. for example, none of the windings 54, 58 of the stators 52, 56 is energized. The sprocket 36 is driven by the wraparound drive 34 and rotates loosely therewith out a connection to the shaft piece 44. The gearing 42 therefore does not transmit any forces to the adjusting shaft 30, and therefore the latter can rotate freely.

The integral gas pressure 20, which is greater at high compression than at low compression, presses the piston 16 and the main connecting rod 22 downward. The trans-verse lever 24 is therefore rotated about its point of articulation 86 on the crankshaft 18, and the auxiliary connecting rod 26 rotates the eccentric 28 and the adjusting shaft 30. Said rotational movement can be assisted by a spring 88 which biases the adjusting shaft 30 toward the second stop 84, since the adjusting force from the integral gas pressure 20 is small and virtually disappears close to the dead center on account of the lever ratios between the eccentric 28 and the auxiliary piston rod 26.

The two stops 82, 84 for the adjusting shaft 30 are arranged such that a sufficient clearance distance to a dead-center position is always maintained between the adjusting shaft 30 and the auxiliary piston rod 26. A dead-center position between the adjusting shaft 30 and the auxiliary piston rod 26 lies here at the angles of 0° and 180° between the directions of action of the two components.

An actuation of the device 12 in order to adjust the compression ratio to a high or to a low compression can take place during continued operation of the internal combustion engine 10 at any desired operating point and is triggered by a control unit (not illustrated) as a function of various parameters, such as load, rotational speed, fuel quality, temperature and the like.

Figure 3:
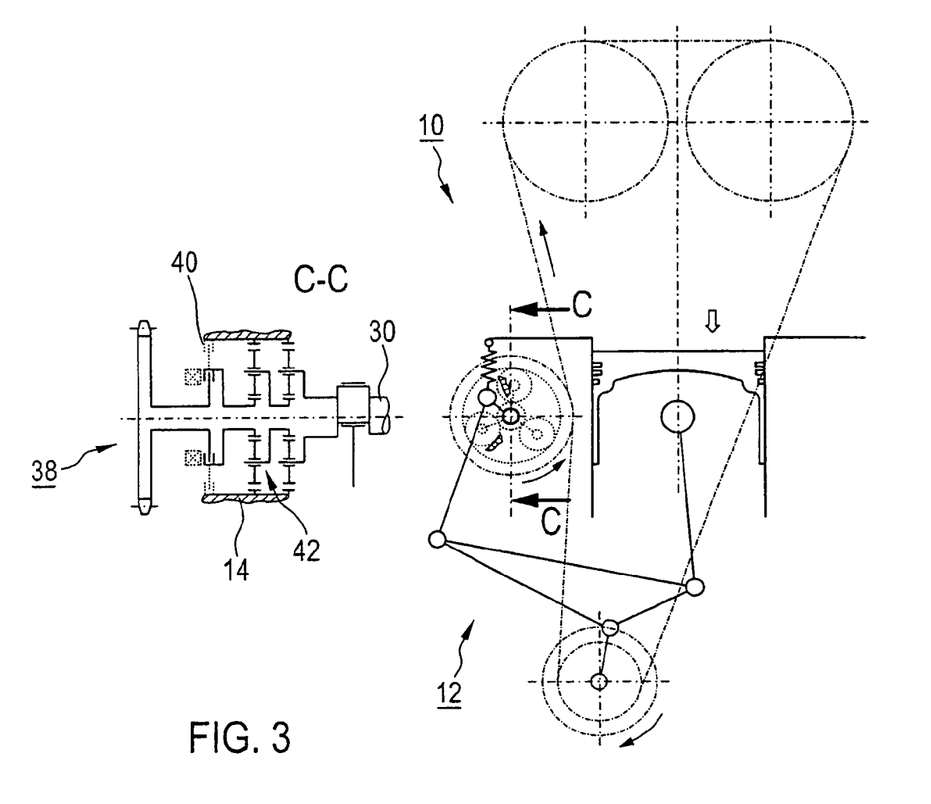
FIG. 3 shows a schematic illustration of the first embodiment of the device for varying the compression ratio in a setting with the adjusting shaft blocked.

FIG. 3 illustrates, schematically in a cross section and a partial longitudinal section, the internal combustion engine 10 from FIGS. 1 and 2 having the device 12 for varying the compression ratio, in an operating state with the adjusting shaft 30 blocked. In FIG. 3, identical elements and components are provided with the same reference numbers as in FIGS. 1 and 2.

In this case, the coupling mechanism 40 of the drive device 38 is activated in such a manner that its brake function is activated. That is to say, the gearing 42 and therefore the adjusting shaft 30 are blocked or braked by the housing 14 by, for example, the winding 58 of the stator 56 being energized. In this way, the compression of the internal combustion engine 10 is not varied and remains at the presently set value. This brake function of the coupling mechanism 40 can be activated in principle in every rotational position of the adjusting shaft 30, i.e. for any compression ratio.

The brake function of the coupling mechanism 40 has to be intentionally activated. In the event of a failure or malfunction of the activation or of the coupling mechanism 40, a position of the adjusting shaft 30 with low compression is automatically assumed. In this way, it is possible for the internal combustion engine 10 to continue to operate without risk with reduced power under some circumstances, as a result of which it is possible, for example, in the case of use in a motor vehicle, to travel on to a workshop under the vehicle's own power.

Figure 8:
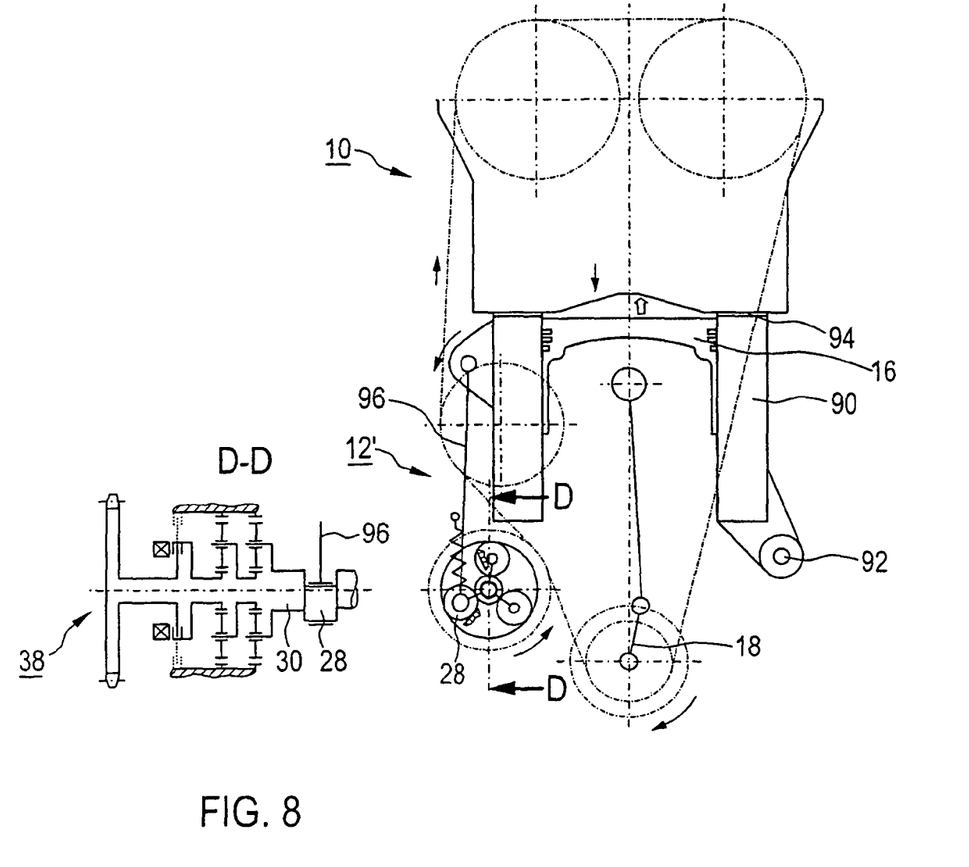
FIG. 8 shows a schematic illustration of a second embodiment of a device for varying the compression ratio.
Figure 9:
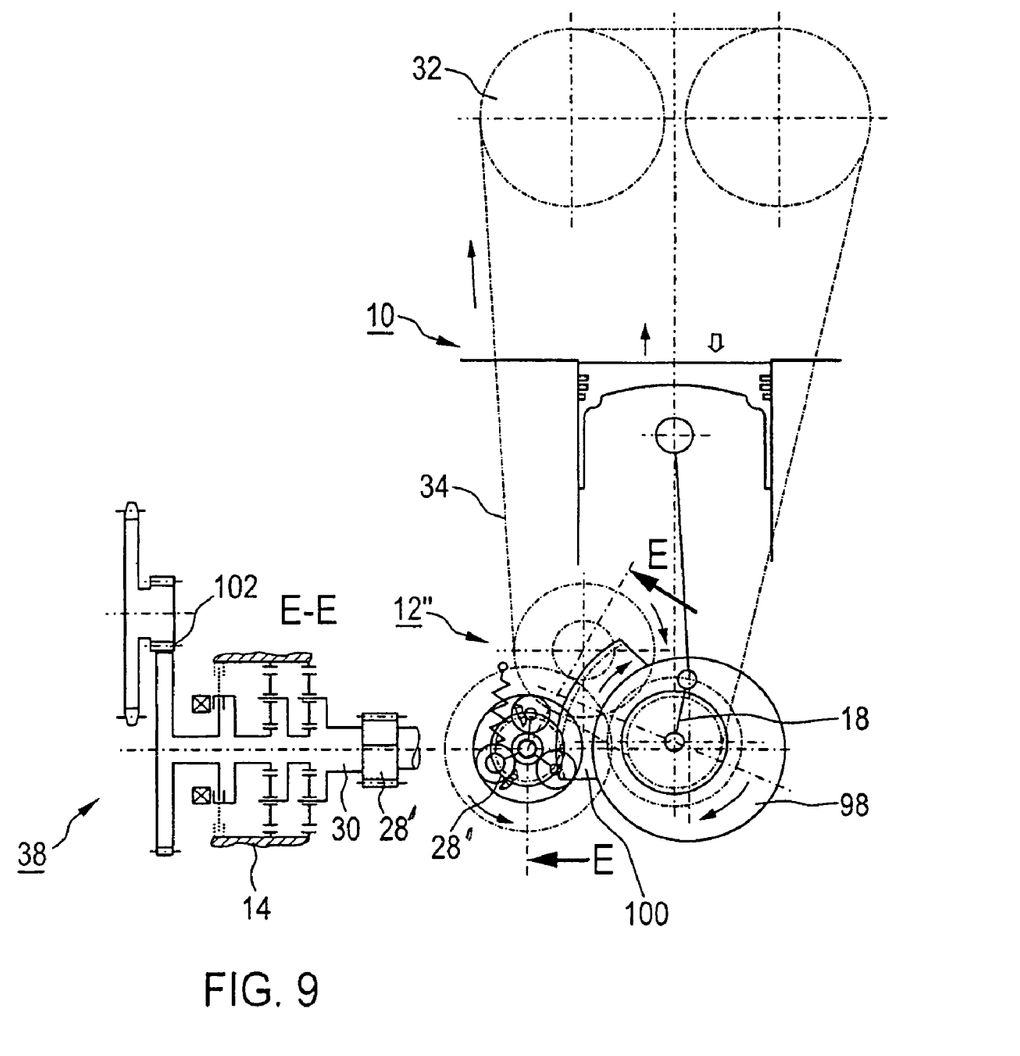
FIG. 9 shows a schematic illustration of a third embodiment of a device for varying the compression ratio.
Figure 10:
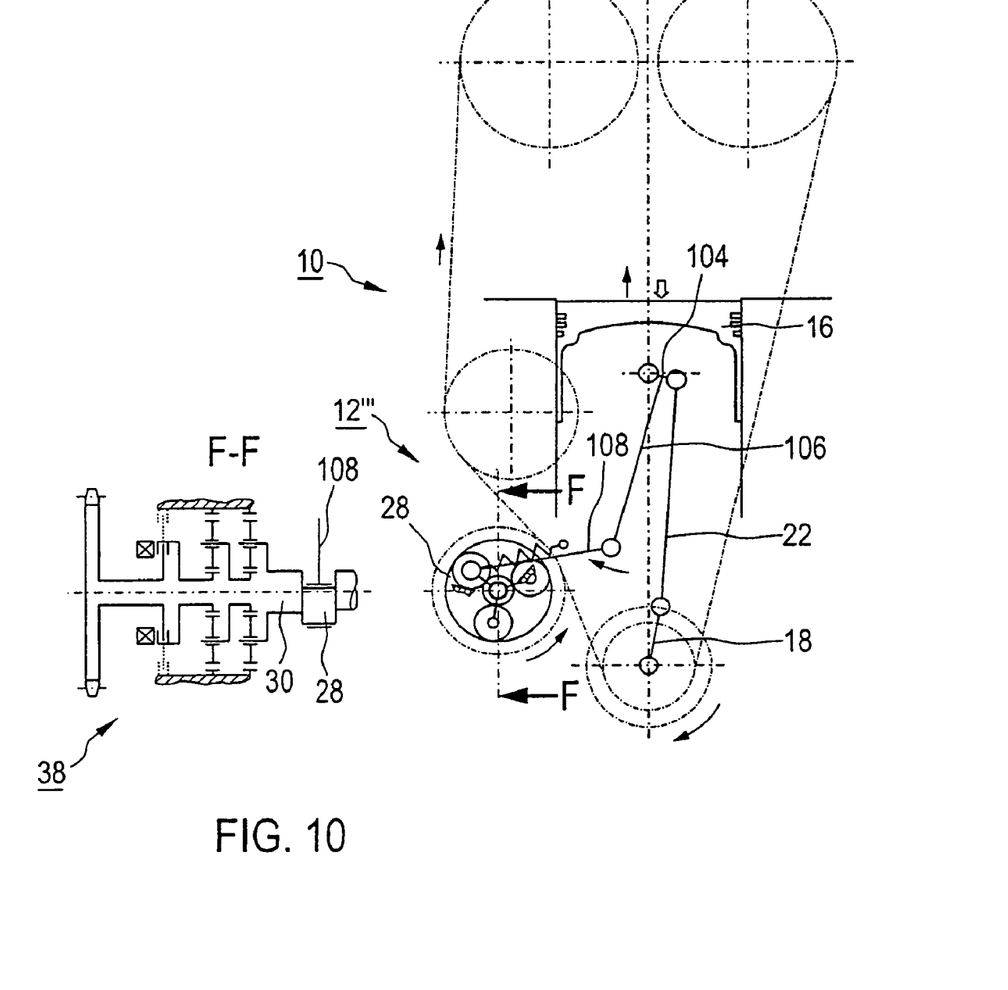
FIG. 10 shows a schematic illustration of a fourth embodiment of a device for varying the compression ratio.

With reference to FIGS. 8 to 10, three further embodiments of a device 12 for varying the compression ratio are described in more detail below, with the drive device 38 of the invention, which device is explained in more detail above with reference to FIGS. 4 to 6, being equally applicable to all said devices 12 without being explained in each case once again in detail.

The devices 12', 12", 12'" for varying the compression ratio are each shown in an illustration analogous to FIG. 1, i.e. in an operating state of the adjustment in the direction of a high compression. The same components as in the first embodiment of FIGS. 1 to 3 are again identified by the same reference numbers.

The internal combustion engine 10 of FIG. 8 has a cylinder housing 90 in which the piston 16 moves. The cylinder housing 90 is mounted so as to be pivotable about a pivot axis 92, as a result of which the spacing of an upper edge 94 of the cylinder housing 90 from the center of the crankshaft 18 can be set to different values, and the compression ratio is thereby variable.

The device 12' for varying the compression ratio essentially comprises an eccentric 28 and an adjusting rod 96 which serves as an adjusting link of the invention and is fastened at one side to the eccentric 28 and at the other end to the cylinder housing 90. The eccentric 28 is arranged on the adjusting shaft 30. As a result of the rotation of the adjusting shaft 30 and therefore of the eccentric 28 in the above-described manner, the cylinder housing 90 is pivoted by the adjusting rod 96. The adjustment in the direction of high or low compression and the blocking of the adjusting shaft 30 in order to maintain the present compression take place by means of the drive device 38 via the device 12' in the same manner as is described above in conjunction with FIGS. 1 to 7.

The internal combustion engine 10 of the third embodiment illustrated in FIG. 9 has a crankshaft 18 whose center can be moved relative to the housing 14 of the internal combustion engine 10 in order to thereby vary the compression ratio of the internal combustion engine 10.

The center of the crankshaft 18 is mounted on a base bearing eccentric 98 which, for its part, can be rotated by the device 12" for varying the compression ratio. The device 12" essentially comprises an eccentric 28 and an adjusting lever 100 which, on one side, is engaged by a gear 28' at the drive device 38 and, on the other side, is fastened to the base bearing eccentric 98. The gear 28' is arranged on the adjusting shaft 30 which is driven, via a step-up gear wheel mechanism 102, by the wraparound drive 34 for driving the camshafts 32 by means of the drive device 38. By means of the rotation of the adjusting shaft 30 and therefore of the gear 28', the base bearing eccentric 98 is rotated by means of the adjusting lever 100, and the compression ratio is thereby varied. The adjustment in the direction of high or low compression and the blocking of the adjusting shaft 30 in order to maintain the present compression takes place by means of the drive device 38 via the device 12" in the same way as is described above in conjunction with FIGS. 1 to 7.

The internal combustion engine 10 of the fourth variant embodiment illustrated in FIG. 10 has a piston 16 which is connected by means of an eccentric connecting rod bearing 104 and the main piston rod 22 to the crankshaft 18. The eccentric connecting rod bearing 104 is fixedly connected to a connecting rod adjusting lever 106 which, for its part, can be pivoted by the device 12'" for varying the compression ratio.

The device 12'" here essentially comprises an eccentric 28 and a connecting rod 34 which is fastened at one side to the eccentric 28 and at the other end to the piston rod adjusting lever 106. The eccentric 28 is arranged on the adjusting shaft 30. By means of the rotation of the adjusting shaft 30 and therefore of the eccentric 28, the piston rod adjusting lever 106 is moved by means of the connecting rod 108, the eccentric piston bearing rod 104 is rotated and the compression ratio is thereby varied. The adjustment in the direction of high or low compression and the blocking of the adjusting shaft 30 in order to maintain the present compression takes place by means of the drive device 38 via the device 12'" in the same manner as is described above in conjunction with FIGS. 1 to 7.

The present invention is not restricted to the specific exemplary embodiments which are described above and are illustrated in the drawings. Numerous variants and modifications which lie within the scope of protection of the invention, as defined by the appended claims, are obvious to a person skilled in the art. In particular, all the features illustrated with reference to FIGS. 1 to 7 can also be used in the further embodiments of FIGS. 8 to 10.

What is claimed is:

1. An internal combustion engine (10) comprising cylinders arranged in a housing (14), a crankshaft (18) rotatably supported in the housing (14), pistons (16) movably disposed in the cylinders and defining in the cylinders combustion chambers, and a device (12; 12'; 12"; 12'") for varying a compression ratio of the internal combustion engine (10), the device (12; 12', 12", 12'") including, for at least one cylinder:
   an adjusting structure (26; 96; 100; 108) for varying one of the effective length of a connecting rod (22) of the piston (16), the lift of the crankshaft (18) and an upper edge (94) of the cylinders with respect to its position relative to the center of the crankshaft (18);
   an operating means (28, 28') mounted in the housing (14) for varying one of the position and the direction of the adjusting structure (26; 96; 100; 108); and a drive device (38) operated by the crankshaft (18) and including a adjusting shaft (30) carrying the operating means (28, 28'), and a coupling mechanism (40) with an integrated brake function, by which the adjusting shaft (30) can either be placed in operative connection with the crankshaft (18) or can be locked in a particular position for maintaining a given compression ratio of the engine.

2. The internal combustion engine (10) as claimed in claim 1, wherein the coupling mechanism (40) comprises:

a rotor (15) consisting of a hysteresis material which is in operative connection with the adjusting shaft (30);

a first pole structure (48) which is connected in a rotationally fixed manner to a drive wheel (36) driven by the crankshaft (18); and a second pole structure (60) which is connected fixedly to the housing (14), the first and the second pole structures (48, 60) being activatable depending on engine operating conditions for adjusting the engine compression ratio.

3. The internal combustion engine (10) as claimed in claim 2, wherein the first pole structure (48) is provided with a first housing-mounted winding (54), and the second pole structure (60) is provided with a second housing-mounted winding (58), which windings can be energized as needed for the adjustment of the engine compression ratio.

4. The internal combustion engine (10) as claimed in claim 1, wherein the coupling mechanism (40) comprises:

an armature (70) made of a magnetizable material, which is in operative connection with the adjusting shaft (30);

a spring element (80) which biases the armature (70) into a rotational connection with a drive wheel (36) driven by the crankshaft (18); and a selectively activatable winding (74) which is fixedly connected to the housing (14) for pulling the armature (70) counter to the force of the spring element (80) into engagement with the housing (14) for locking the drive device (38).

5. The internal combustion engine (10) as claimed in claim 1, wherein the drive device (38) includes a gearing (42).

6. The internal combustion engine (10) as claimed in claim 1, wherein the drive device (38) is operatively connected to one of a wraparound drive and a rolling contact gearing (34) driving camshafts (32) of the engine.

* * * * *